(12) United States Patent
Williams et al.

(10) Patent No.: US 8,483,687 B2
(45) Date of Patent: Jul. 9, 2013

(54) ARRANGEMENT AND METHOD FOR RADIO NETWORK RELOCATION

(75) Inventors: Andrew Gordon Williams, Wiltshire (GB); Timothy J. Speight, Bristol (GB)

(73) Assignee: Nvidia Corporation, Santa Clara, CA (US)

( * ) Notice: Subject to any disclaimer, the term of this patent is extended or adjusted under 35 U.S.C. 154(b) by 875 days.

(21) Appl. No.: 11/597,086

(22) PCT Filed: May 10, 2005

(86) PCT No.: PCT/EP2005/052115
§ 371 (c)(1),
(2), (4) Date: Sep. 4, 2007

(87) PCT Pub. No.: WO2005/112499
PCT Pub. Date: Nov. 24, 2005

(65) Prior Publication Data
US 2007/0298800 A1    Dec. 27, 2007

(30) Foreign Application Priority Data
May 17, 2004   (GB) .................................. 0410987.2

(51) Int. Cl.
*H04W 36/00* (2009.01)
(52) U.S. Cl.
USPC ........... 455/436; 455/439; 455/442; 455/444; 455/432.1; 370/331; 370/401; 370/469
(58) Field of Classification Search
USPC ....... 455/436, 439, 442, 444, 432.1; 370/331, 370/401, 469
See application file for complete search history.

(56) References Cited

U.S. PATENT DOCUMENTS

| | | | |
|---|---|---|---|
| 6,668,170 B2 | 12/2003 | Costa et al. | |
| 7,215,958 B2 | 5/2007 | Kovacs et al. | |
| 7,242,933 B1 * | 7/2007 | Ahmavaara | 455/436 |
| 2003/0003919 A1 | 1/2003 | Beming et al. | |

(Continued)

FOREIGN PATENT DOCUMENTS

| | | |
|---|---|---|
| EP | 1337125 A2 | 8/2003 |
| EP | 1392067 A1 | 2/2004 |

(Continued)

OTHER PUBLICATIONS

"3rd Generation Partnership Project; Technical Specification Group Radio Access Network; Radio Resource Control (RRC); Protocol Specification (Release 6)," (Jun. 2006). 3GPP:Valbonne, France, TS 25.331 v6.10.0:1-1226.

(Continued)

*Primary Examiner* — Kwasi Karikari (57) ABSTRACT

An arrangement and method for radio network relocation of a mobile terminal (114) from a first base station controller (122) to a second base station controller (122') by anchoring at least some SGSN functions with respect to the first base station controller; and relocating at least some RNC functions from the first base station controller to the second base station controller. RNC (124), SGSN (132) and GGSN (134) components may be integrated together, and the RNC (124) may be parented by an SGSN. Alternatively, RANAP SGSN functionality may be split between SGSN and RNC, RANAP and user plane signals may be relayed by the first base station controller to the second base station controller, and the first base station controller may act as an anchor.

34 Claims, 10 Drawing Sheets

U.S. PATENT DOCUMENTS

| | | |
|---|---|---|
| 2003/0007490 A1 | 1/2003 | Yi et al. |
| 2003/0067891 A1* | 4/2003 | Jones et al. .................. 370/328 |
| 2005/0026616 A1* | 2/2005 | Cavalli et al. ................. 455/436 |

FOREIGN PATENT DOCUMENTS

| | | |
|---|---|---|
| GB | 2 376 842 | 12/2002 |
| GB | 2376842 A | 12/2002 |
| GB | 2414361 A | 11/2005 |
| WO | WO-99/51051 A2 | 10/1999 |
| WO | WO-00/11878 A2 | 3/2000 |
| WO | WO-01/76282 A2 | 10/2001 |
| WO | WO-02/065796 A1 | 8/2002 |

OTHER PUBLICATIONS

"3rd Generation Partnership Project; Technical Specification Group Radio Access Network; UTRAN overall description (Release 6)," (Sep. 2006). 3GPP:Valbonne, France, TS 25.401 v6.8.0:1-48.

"3rd Generation Partnership Project; Technical Specification Group Services and System Aspects; General Packet Radio Service (GPRS); Service description; Stage 2 (Release 6)," (Sep. 2006). 3GPP:Valbonne, France, TS 23.060 v6.14.0:1-209.

International Search Report mailed Sep. 29, 2005, for PCT Application No. PCT/EP2005/052115 filed May 10, 2005.

* cited by examiner

ARRANGEMENT AND METHOD FOR RADIO NETWORK RELOCATION

CROSS-REFERENCE TO RELATED APPLICATIONS

This application is a U.S. national phase application of International Application No. PCT/EP2005/052115, filed May 10, 2005, which claims priority to United Kingdom Application No. 0410987.2, filed May 17, 2004, the contents of which are hereby incorporated by reference into the present disclosure in their entirety.

FIELD OF THE INVENTION

This invention relates to an arrangement for radio network relocation of a mobile station, such as for handover or cell reselection of a mobile terminal within a radio network, and particularly (though not exclusively) within a 3GPP ($3^{rd}$ Generation Partnership Project) UMTS (Universal Mobile Telecommunication System) network.

BACKGROUND OF THE INVENTION

In a 3GPP system, a "soft handover" may occur if a mobile terminal or UE (User Equipment) is handed over to two base stations or Node Bs (where the UE can be connected to two or more Node Bs at the same time). The attachment to the new Node B is considered a "hard handover" if the UE lies in Cell-DCH (Dedicated CHannel) state or a "cell reselection" if the UE lies in Cell-FACH (Forward Access CHannel) state as described in the 3GPP Technical Specification 3GPP TS 25.331, available from the 3GPP website at www.3gpp.org.

In 3GPP, it is known that there are two methods to accommodate the handover of a UE between RNCs (Radio Network Controllers). In a first known method the UE's protocols (RRC—Radio Resource Control—and RANAP—Radio Access Network Application Part) are left untouched, but the signalling and user plane traffic is forwarded over the Iur interface to the new RNC that now parents the Node B communicating to the UE. This new RNC is called the Drift RNC (DRNC), whilst the RNC with the RRC entity is called the Serving RNC (SRNC). These terms are particular to the UE.

The advantages of this method are:
  it is transparent to the SGSN (Serving GPRS Support Node)
  there is no need to move the UE's protocols and contexts from the SRNC, and since network signalling is only required between two peer (RNC) elements handover should be rapid.

However, using a DRNC in this way does introduce some difficulties:
  the radio resources of the Node B are managed by the radio resource management (RRM) within the DRNC, but the measurements performed by the UE to support this terminate at the SRNC, and must then be forwarded over the Iur interface
  The RRM is unable to manage the loading or resource consumption of traffic on dedicated channels that are scheduled at the UE and SRNC
  Flow control of user plane traffic on common channels is required on the Iur interface
  The extended path of the RRC protocol increases signalling latency between the UE and the radio network
  Traffic loading on the Iur interface increases
  A fully compliant Iur interface is required to carry user and control plane data A second known method, alternative to using a DRNC in 3GPP, is to perform a SRNS (Serving Radio Network System) Relocation. In this procedure the UE's protocols within the radio network are moved to the new RNC. The Iu connection used is also switched from the SGSN to the new RNC, for user and control planes. The new RNC is known as the Target RNC during the relocation. To do this, extensive signalling takes place between the old and new RNCs and the SGSN (using RANAP) and also (cell reselection only) between the RNCs themselves over the Iur interface (using RNSAP—Radio Network Subsystem Application Part—protocol).

The advantages and disdavantages of such SRNS Relocation are the opposite of those of using the DRNS. Clearly, to perform this method the SGSN must support relocation. The rôles it plays are:
  Receiving RANAP messages from one RNC, recycling each message, and forwarding it to the other RNC
  In doing this the SGSN provides information about the radio access bearers existing for the UE (RANAP Relocation Request message) to the target RNC
  Switching over the Iu connection
  Other known handover techniques include that used in GSM (Global System for Mobile communications). In GSM, when a UE hands over to a cell under the jurisdiction of a new MSC (Mobile Switch Centre), the call is routed through the old MSC, the anchor MSC. Since in GSM a BSC (Base Station Controller)—BSC interface does not exist, it is not possible to use an anchor BSC. The anchor MSC allows simple billing as the UE moves.

3GPP SRNS Relocation as described above, and variants thereof, are known from a variety of patent publications:
  US2003036387 assumes soft handover and is not applicable
  US2003003919 discloses 3GPP SRNS Relocation, with an emphasis on the use of NBAP (Node B Application Part) and RNSAP messages to establish a new transport bearer between target RNC and Node B
  WO0176282 discloses a technique in which the SRNC tells the Target RNC which transport channels it should use for the UE
  EP1337125 addresses the transfer of ciphering info, source to target
  US2001046218 considers synchronised handover (framing alignment, FDD mode only)
  US2003007490 discloses lossless SRNS Relocation
  WO002065796 discloses the control and user planes being split on the Iu, with only the user plane being relocated.

However, the disclosed systems are suboptimal in many situations and tend to result in a complex or inflexible system, to be impractical for many applications and/or to result in suboptimal performance and excessive signalling.

Hence, an improved system for radio network relocation of a mobile station would be advantageous.

STATEMENT OF INVENTION

Accordingly, the Invention seeks to preferably mitigate, alleviate or eliminate one or more of the above mentioned disadvantages singly or in any combination.

In accordance with a first aspect of the present invention there is provided an arrangement for radio network relocation as claimed in claim 1.

In accordance with a second aspect of the present invention there is provided an method for radio network relocation utilising as claimed in claim 19.

BRIEF DESCRIPTION OF THE DRAWINGS(S)

Two schemes for radio network relocation utilising an anchor incorporating some embodiments of the present invention will now be described, by way of example only, with reference to the accompanying drawing(s), in which.

DESCRIPTION OF PREFERRED EMBODIMENT(S)

The following preferred embodiments of the present invention will be described in the context of a UMTS Radio Access Network (UTRAN) system operating in TDD mode. However, it will be appreciated that the invention may be applicable to many other applications.

The specific embodiments are not directed to soft handover, but it will be appreciated that described concepts may be applicable to both packet-switched domain and circuit-switched domain and to both FDD (Frequency Division Duplex) and TDD (Time Division Duplex) modes. Hereafter in this document, unless the context otherwise requires, "handover" is intended to refer to either hard handover or cell reselection.

Figure 1:
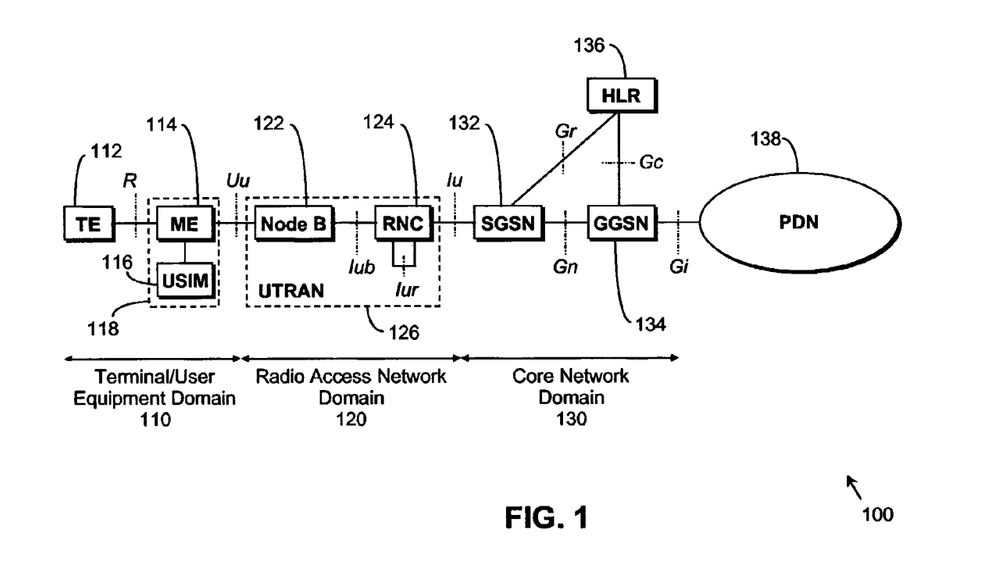
FIG. 1 shows a block schematic diagram illustrating a TDD 3GPP radio communication system in which the present invention may be used.

Referring firstly to FIG. 1, a typical, standard UMTS Radio Access Network (UTRAN) system 100 is conveniently considered as comprising: a terminal/user equipment domain 110; a UMTS Terrestrial Radio Access Network domain 120; and a Core Network domain 130.

In the terminal/user equipment domain 110, terminal equipment (TE) 112 is connected to mobile equipment (ME) 114 via the wired or wireless R interface. The ME 114 is also connected to a user service identity module (USIM) 116; the ME 114 and the USIM 116 together are considered as a user equipment (UE) 118. The UE 118 communicates data with a Node B (base station) 122 in the radio access network domain 120 via the wireless Uu interface. Within the radio access network domain 120, the Node B 122 communicates with an radio network controller (RNC) (a base station controller) 124 via the Iub interface. The RNC 124 communicates with other RNC's (not shown) via the Iur interface. The Node B 122 and the RNC 124 together form the UTRAN 126. The RNC 124 communicates with a serving GPRS service node (SGSN) 132 in the core network domain 130 via the /u interface. Within the core network domain 130, the SGSN 132 communicates with a gateway GPRS support node (GGSN) 134 via the Gn interface; the SGSN 132 and the GGSN 134 communicate with a home location register (HLR) server 136 via the Gr interface and the Gc interface respectively. The GGSN 134 communicates with public data network 138 via the Gi interface.

Thus, the elements RNC 124, SGSN 132 and GGSN 134 are conventionally provided as discrete and separate units (on their own respective software/hardware platforms) divided across the radio access network domain 120 and the core network domain 130, as shown in FIG. 1.

The RNC 124 is the UTRAN element responsible for the control and allocation of resources for numerous Node B's 122; typically 50 to 100 Node B's may be controlled by one RNC. The RNC also provides reliable delivery of user traffic over the air interfaces. RNC's communicate with each other (via the Iur interface) to support handover.

The SGSN 132 is the UMTS Core Network element responsible for Session Control and interface to the HLR. The SGSN keeps track of the location of an individual UE and performs security functions and access control. The SGSN is a large centralised controller for many RNCs.

The GGSN 134 is the UMTS Core Network element responsible for concentrating and tunnelling user data within the core packet network to the ultimate destination (e.g., internet service provider—ISP).

Such a UTRAN system and its operation are described more fully in the 3GPP technical specification documents 3GPP TS 25.401, 3GPP TS 23.060, and related documents, available from the 3GPP website at www.3gpp.org, and need not be described in more detail herein.

Figure 2:
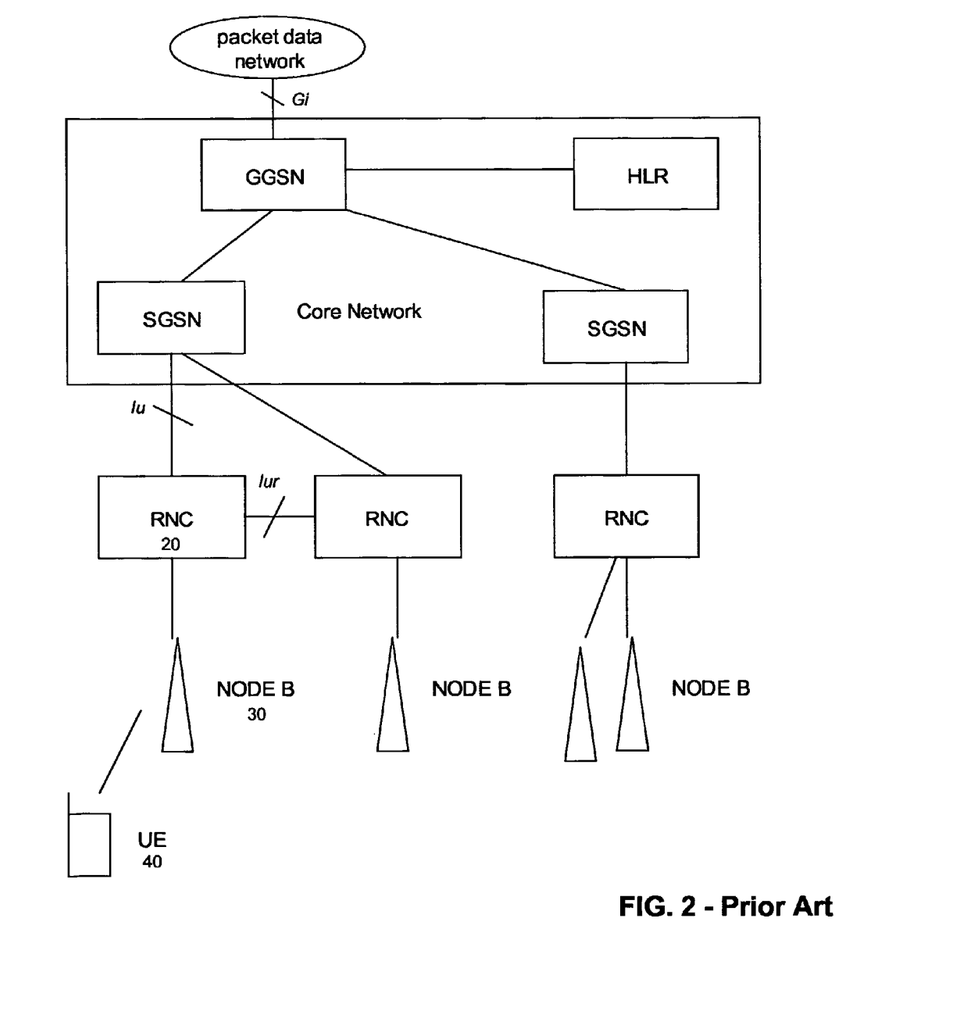
FIG. 2 shows a block schematic diagram illustrating the packet-switched domain of a known 3GPP UMTS network connected to an external packet data network.
Figure 3:
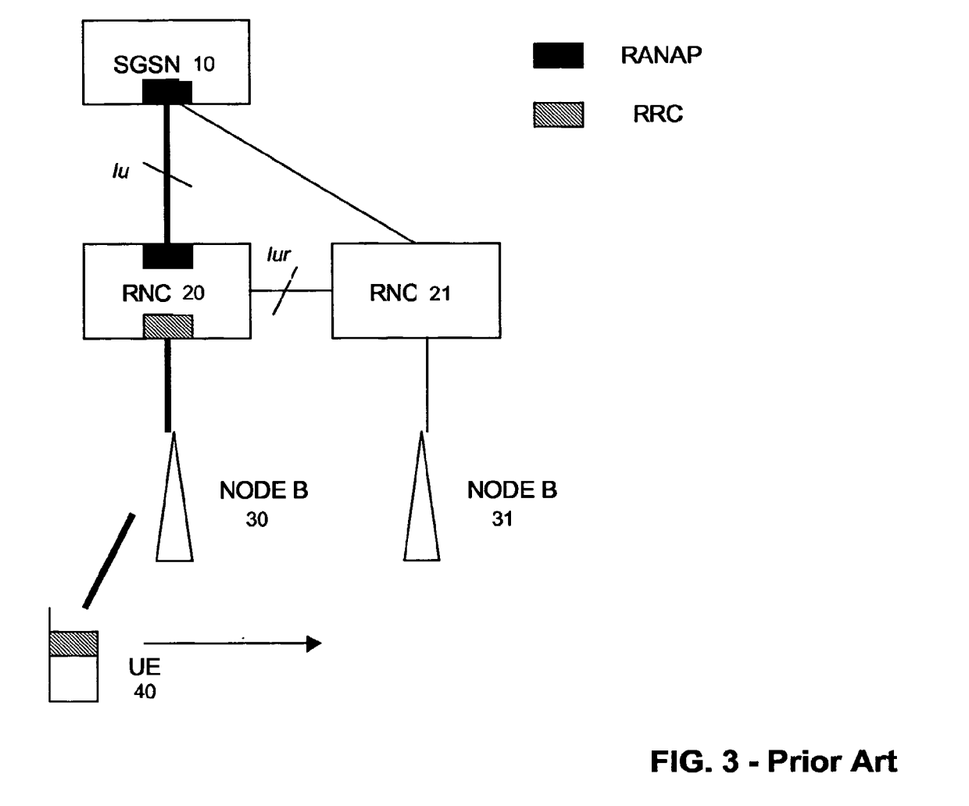
FIG. 3 shows a block schematic diagram illustrating configuration of the known UMTS network of FIG. 2 prior to UE movement into coverage of a new Node B.

FIG. 2 illustrates the Packet-Switched (PS) domain of a 3GPP UMTS network, in which a UE 40 is connected to an external packet data network via a Node B 30, RNC 20 and UMTS "core network". FIG. 3 illustrates the situation in a UMTS PS network before handover, and shows configuration of the UMTS network prior to movement of the UE 40 into the coverage of another Node B 31 associated with another RNC 21. The thick line shows the user plane and control plane paths to the UE. The control plane protocols are RANAP, between RNC and SGSN 10, and RRC between the RNC 20 and the UE 40.

Figure 4:
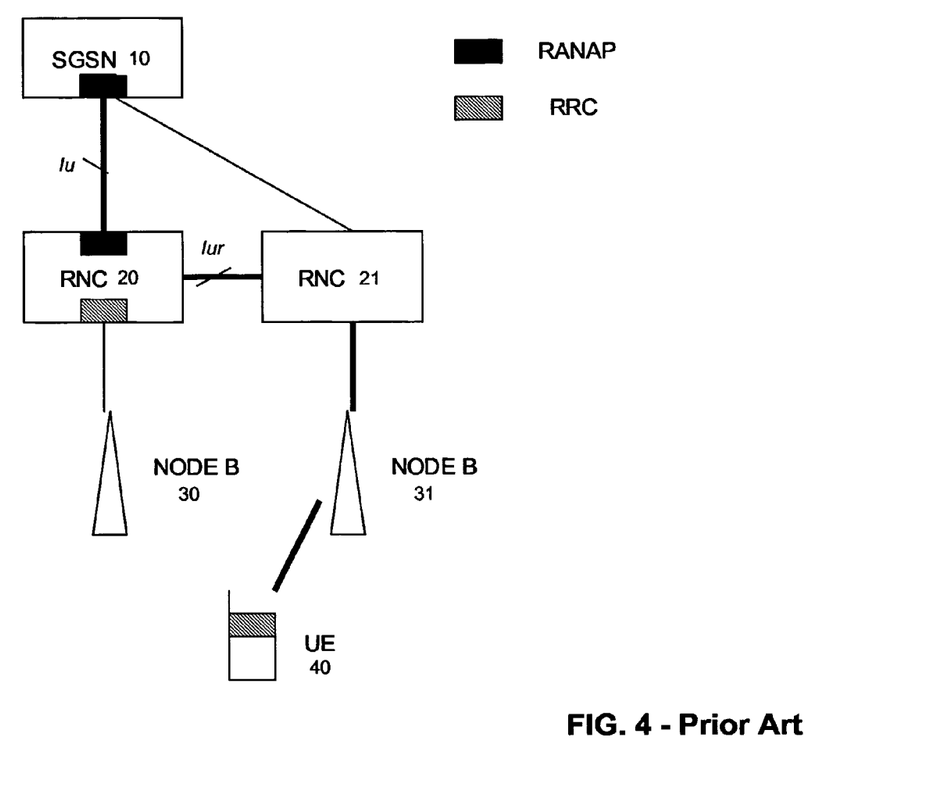
FIG. 4 shows a block schematic diagram illustrating configuration of the known UMTS network of FIG. 2 after UE attachment to a new Node B using a first known handover method.
Figure 5:
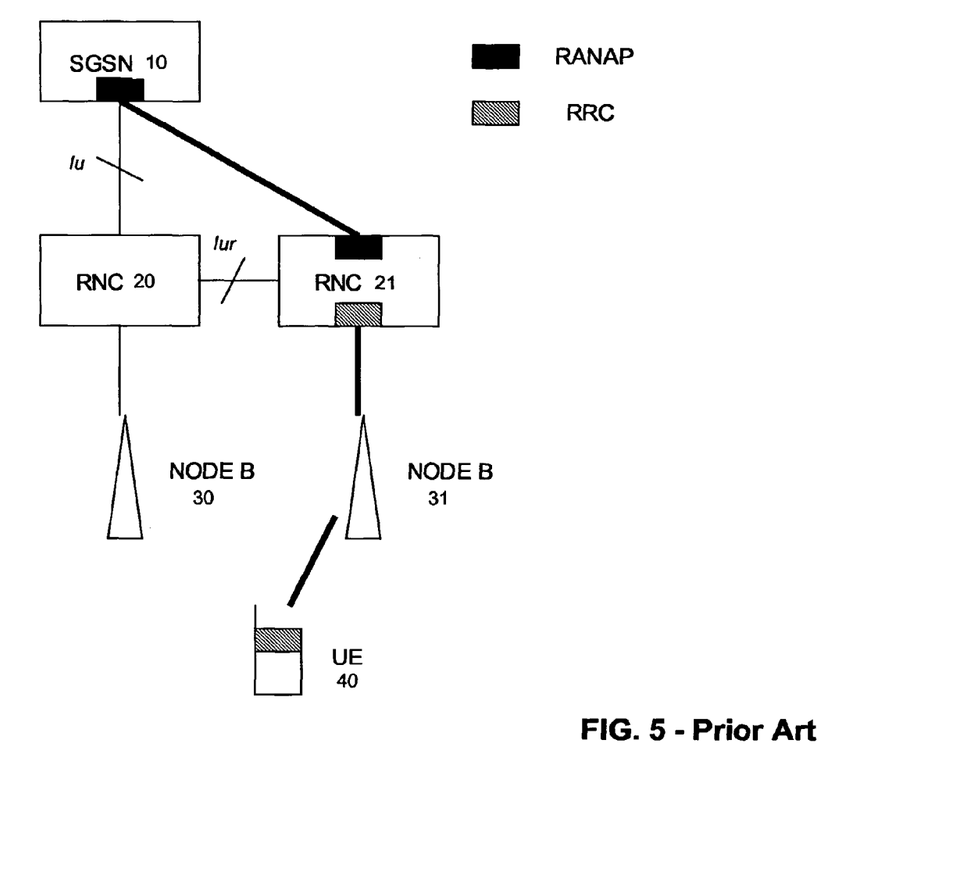
FIG. 5 shows a block schematic diagram illustrating configuration of the known UMTS network of FIG. 2 after UE attachment to a new Node B using a second known handover method.

FIG. 4 and FIG. 5 show respectively two methods known in 3GPP to accommodate the handover between RNCs.

FIG. 4 illustrates transfer from a Serving RNC 20 to a Drift RNC (DRNC) 21 in which the Iur interface is used to transfer user and control plane traffic to the UE 40, and shows configuration after the UE 40 has attached to Node B 31. The advantages and disadvantages of such a DRNC method are discussed in detail above.

FIG. 5 illustrates the alternative to using a DRNC in 3GPP is to perform a SRNS Relocation. In this alternative procedure as shown, the UE's protocols within the radio network are moved to the target RNC 21. The Iu connection used by the UE is also switched from the SGSN 10 to the target RNC 21, for user and control planes. To do this extensive signalling takes place between the two RNCs 20 and 21 and the SGSN (using RANAP) and also (cell reselection only) between the RNCs themselves over the Iur interface (RNSAP protocol). As discussed above, the advantages and disadvantages of SRNS Relocation tend to be the opposite of those of using DRNS. Clearly, to perform this method the SGSN must support relocation and perform the following rôles of: receiving RANAP messages from one RNC, recycling each message and forwarding it to the other RNC (in doing this the SGSN provides information about the radio access bearers existing for the UE (RANAP Relocation Request message)) and switching over the Iu connection.

As will be explained in greater detail below, the described embodiments of the present invention advantageously provide new schemes (A and B) involved in radio network relocation. These new schemes introduce changes to the 3GPP architecture and extend its signalling protocols: Scheme A impacts both UMTS RAN (Radio Access Network) and CN (Core Network), whilst scheme B only impacts the RAN.

Scheme A

Figure 6:
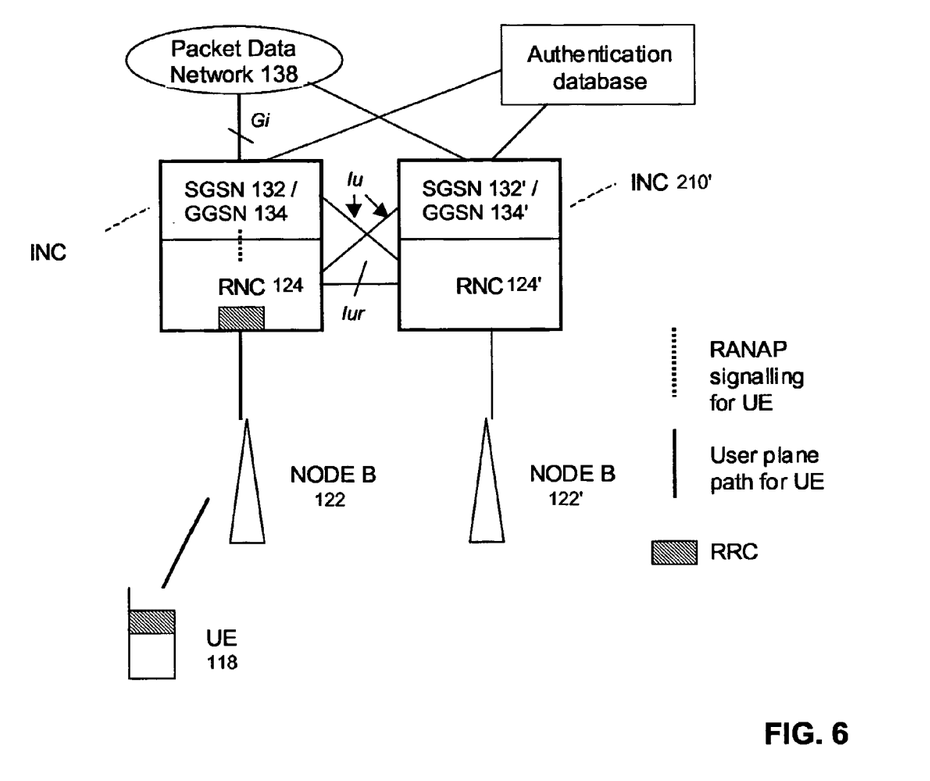
FIG. 6 shows a block schematic diagram illustrating configuration of the UMTS network of FIG. 1 and user plane and signalling paths prior to UE movement into coverage of a new Node B using handover incorporating the present invention.

Referring also to FIG. 6 (which uses where possible the same numbering as in FIG. 1 to indicate the same elements), in a first preferred embodiment of the invention the 3GPP architecture of FIG. 2 is modified as follows:

a) the RNC (124, 125)/SGSN (132, 133)/GGSN (134, 135) functionality is colocated in a single entity 210, 211, called the Integrated Network Controller (INC), as described more fully for example in patent publication GB 2,376,842 with the same applicant as the present application, b) the RNC component 124, 125 can be parented by one or more SGSN (132, 133) components, c) as a UE 118 moves across the network, the SGSN (132, 133)/GGSN (134, 135) parent is anchored, whilst the RNC contexts of the UE (RLC—Radio Link Control, MAC—Medium Access Control, PDCP—Packet Data Convergence Protocol, RRC—Radio Resource Control) are relocated.

Figure 7:
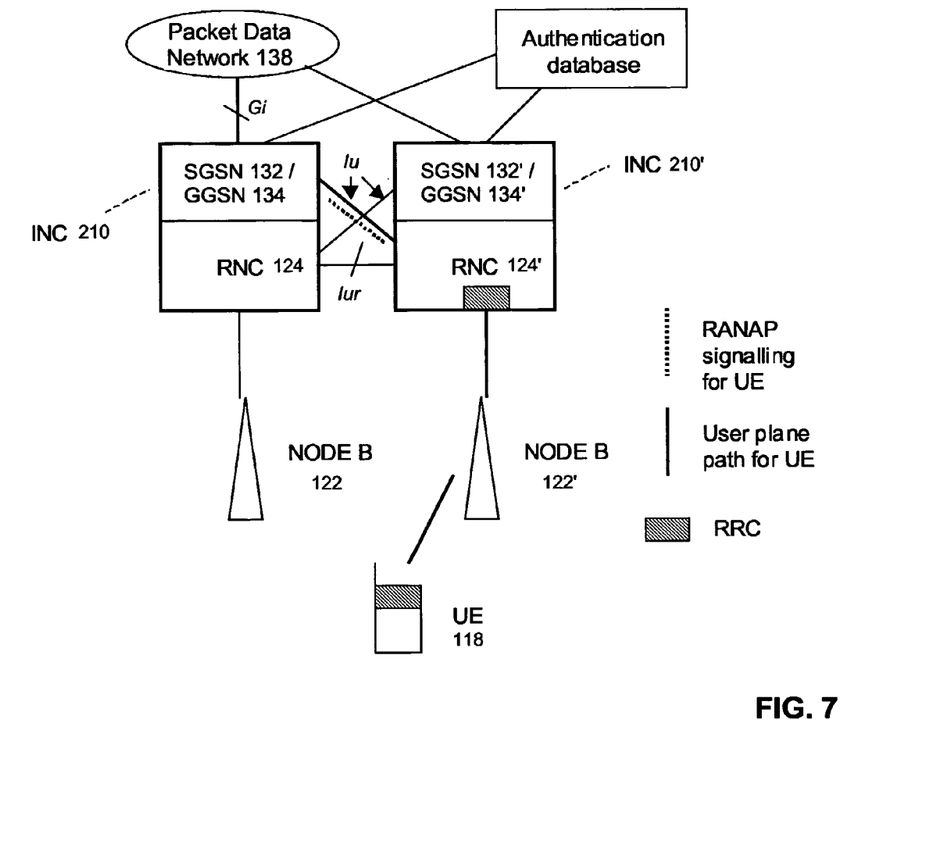
FIG. 7 shows a block schematic diagram illustrating configuration of the UMTS network of FIG. 1 and FIG. 6 and user plane and signalling paths following handover to another Node B incorporating a first method of the present invention.

Referring now also to FIG. 7, which shows user plane and signalling paths following handover from Node B 122 to Node B 122' connected to INC 210', when the UE 118 hands over from Node B 122 to Node B 122', the 3GPP signalling between the RNC 124' of INC 210' and the SGSN and RNC components of INC 210 follows that of a 3GPP SRNS Relocation, using the RANAP and RNSAP protocols, respectively (RNSAP being needed only for a cell reselection form of "handover"). At the end of the relocation, the UE's RNC contexts (MAC, PDCP, RRC and RLC) have been passed over to the new INC 210'. The SGSN and GGSN holding UE contexts are anchored at INC 210. The user plane is also anchored at INC 210.

Figure 8:
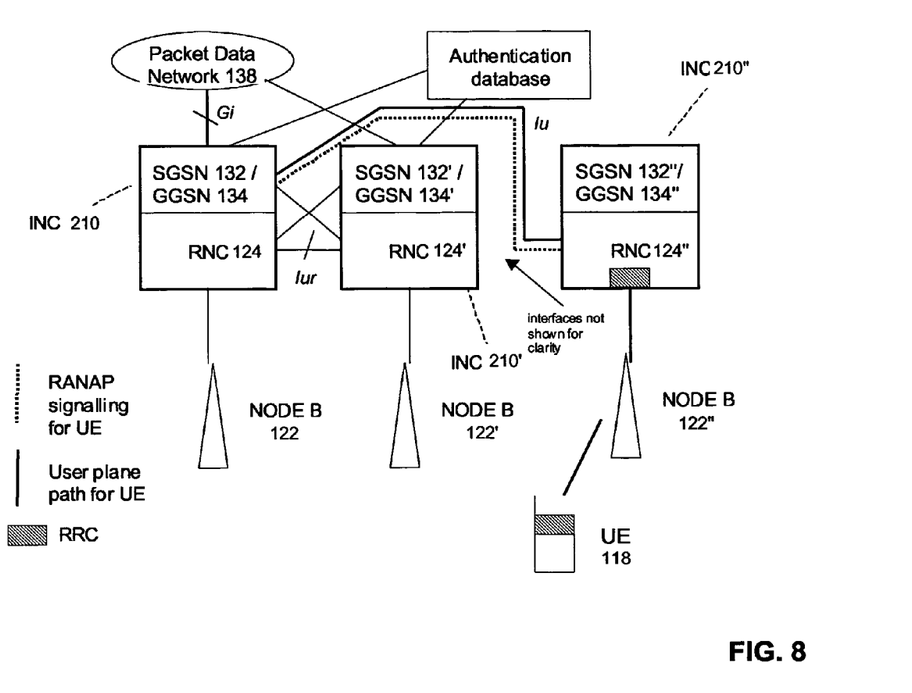
FIG. 8 shows a block schematic diagram similar to that of FIG. 7 illustrating configuration of the UMTS network of FIG. 1 and FIG. 6 and user plane and signalling paths following handover to a third Node B incorporating a first method of the present invention.

Referring now also to FIG. 8, if the UE 118 hands over to a third Node B 122" and third INC 210", RNSAP signalling proceeds between INC 210' and INC 210", and RANAP signalling between INC 210" and INC 210, and between INC 210 and INC 210'. At the end of the relocation, the original INC 210 remains the anchor.

Whilst, in principle, a number of transport network layers (TNLs) may be used to transport the user and control plane traffic between INCs, the following TNL works particularly well in this application: SUA (SCCP—Signalling Connection Control Part—User Adaptation)/SCTP (Stream Control Transmission Protocol)/IP (Internet Protocol) or SUA/TCP (Transmission Control Protocol)/IP with TCP extended to enable message oriented rather than byte-stream data transfer. Transport using IP allows the routes for different UEs to be rapidly reconfigured following a relocation.

In order to support the route reconfiguration the following protocol extensions (over 3GPP) are required:

RANAP must be capable of supporting multiple SGSNs

RNSAP needs to be extended to support the transfer of target RNC IP address information from target to source RNC (so that it can forward it to the anchor SGSN).

It may be noted that the above handover Scheme A tend to provide the following advantages individually or in combination:

RRM (Radio Resource Management) is facilitated by the relocation of the RRC protocol RRC signalling latency is minimised by the relocation of the RRC protocol Collapsing the RNC/SGSN/GGSN into one network element (the INC) reduces the management and maintenance costs An Iu interface is only needed from an anchor INC following a relocation The SGSN—GGSN interface is not needed Multiple parenting of an RNC adds resilience and flexibility to the network.

Scheme B

Figure 9:
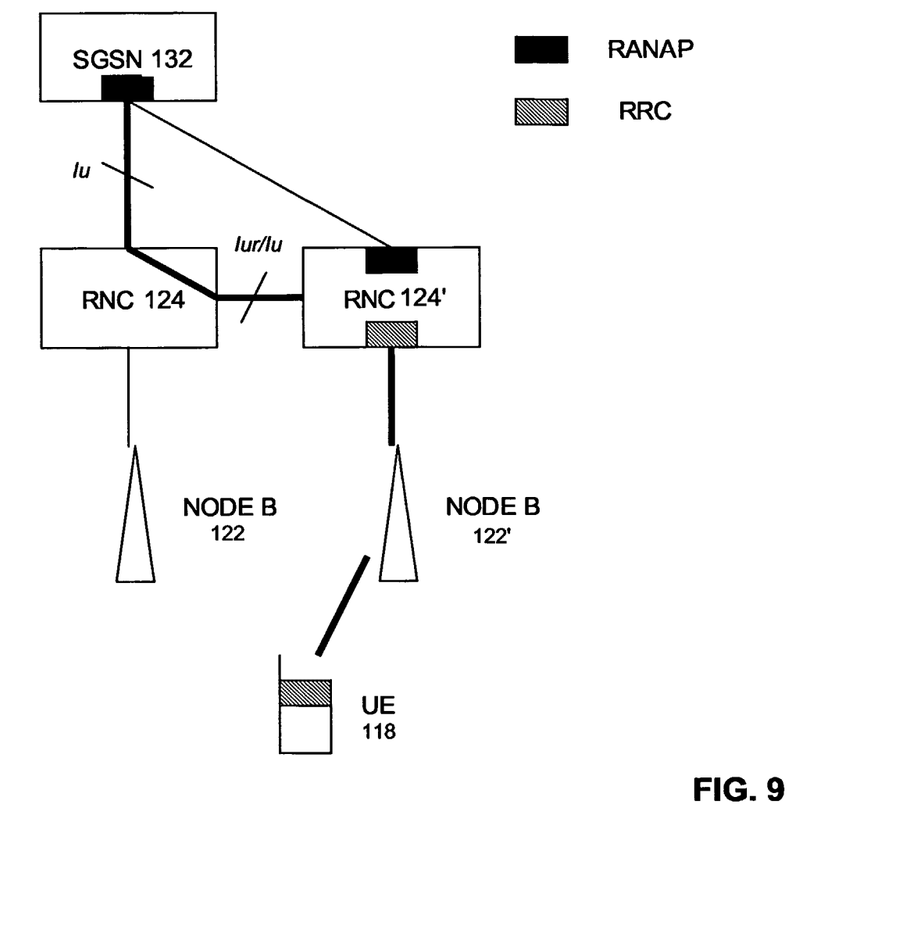
FIG. 9 shows a block schematic diagram illustrating configuration of the UMTS network of FIG. 1 and FIG. 6 and user plane and signalling paths following handover to another Node B incorporating a second method of the present invention.

Referring now to FIG. 9, Scheme B in an embodiment of the present invention employs a 3GPP architecture (e.g., of FIG. 2) and a 3GPP SRNS Relocation is performed, but the RANAP SGSN functionality is split between the SGSN and the RNC. RANAP and user plane are relayed by RNC 124 to RNC 124', and RNC 124 becomes the anchor RNC. This allows the relocation signalling to be passed between the RNCs, in a similar fashion to the way it is passed between INCs in Scheme A, without involving the SGSN itself.

At the end of the procedure as shown in FIG. 9, we have:

i) relocated the UE's RNC protocols (as for 3GPP SRNS Relocation), and ii) maintained the same Iu connection to the SGSN, and thereafter we iii) forward control and user plane data across the Iur from the "Anchor RNC".

During the relocation, the

SGSN is unaware of any activity

Target RNC 124' behaves identically to that in the 3GPP SRNS Relocation except that it receives and transmits the RANAP messages to/from SRNC 124, not to/from the SGSN 132

SRNC 124 plays the combined role of the SRNC and SGSN of the 3GPP SRNS Relocation (it terminates the RANAP messages from the Target RNC that in 3GPP are terminated by the SGSN, and it sources RANAP messages for the Target RNC that normally originate at the SGSN); this role exploits the fact that the SRNC has equal knowledge of the RABs (Radio Access Bearers) established as has the SGSN.

It may be noted that the above handover Scheme B tend to provide the following advantages individually or in combination:

a) From item (i) above, it will be understood that all the disadvantages of the DRNC approach (as discussed above) are eliminated, except for the bandwidth consumption on the Iur interface.

b) From item (ii) above, it will be understood that the SGSN does not need to support SRNS Relocation, and since only two parties RNC 124 and RNC 124' are involved in the relocation signalling, the handover should be fast, faster than a 3GPP SRNS Relocation.

Clearly, it will be understood that as described the preferred embodiments of the invention are not conformant to current 3GPP standards. The software at the RNC must be extended to include the SGSN RANAP signalling (for when the RNC is acting as a SRNC during a relocation); additionally the relay functionality is needed.

Compared to 3GPP relocation (assuming that the SGSN can support relocation), the preferred embodiment of the invention invention as described offers reduced latency of handover, at the expense of increased traffic within the radio access network (over the Iur interface).

Figure 10:
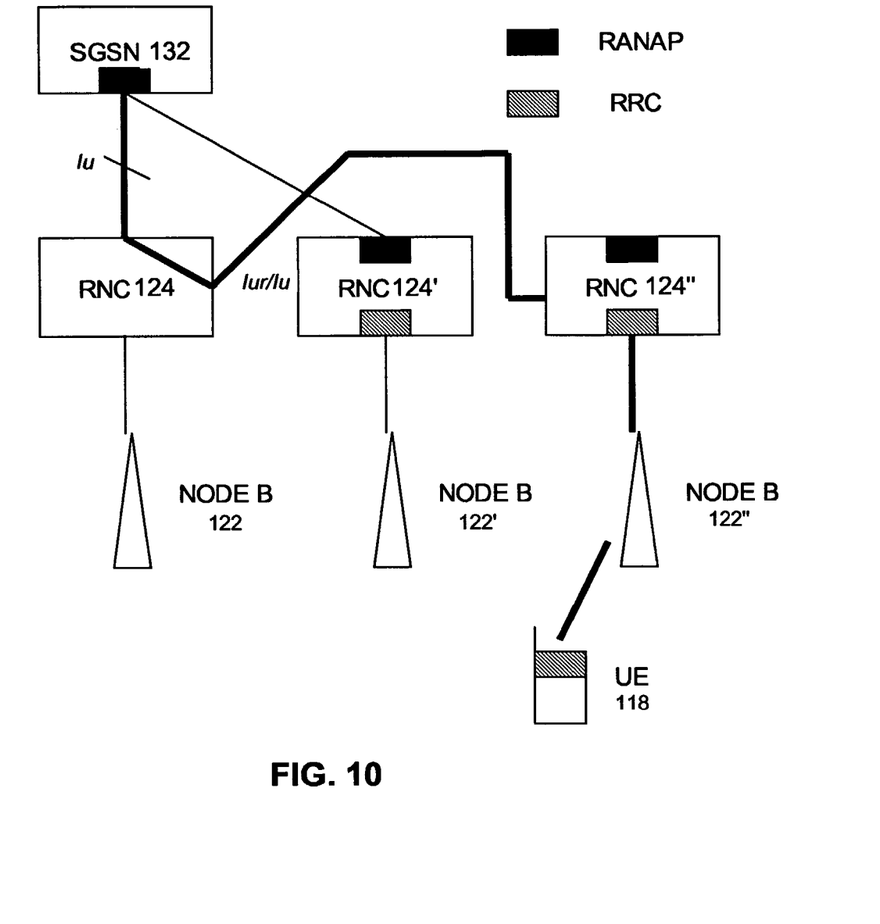
FIG. 10 shows a block schematic diagram similar to that of FIG. 9 illustrating configuration of the UMTS network of FIG. 1 and FIG. 6 and user plane and signalling paths following handover to a third Node B incorporating a second method of the present invention.

Referring now also to FIG. 10, if the UE 118 moves further and hands over to a third RNC 124", the user and control planes are passed from the original anchor RNC 124 directly to the new RNC 124".

In a development of the preferred embodiment of the invention described above, the invention may be selectively used in dependence on traffic characteristics of the Radio Access Bearer used by the UE. Thus, handover either as described above or the 3GPP method, may be selected according to the traffic characteristics of the Radio Access Bearer used by the UE. If the UE is intolerant to handover delays (for example, if the UE is supporting speech) then the invention would be used; if the UE is tolerant to delay the 3GPP method may be employed (particularly if the UE supports high data rates, e.g., high speed FTP—File Transfer Protocol—session).

It will be appreciated that the method for radio network relocation using an anchor described above may be carried out in software running on processors (not shown) in the RNC and/or SGSN, and that the software may be provided as a computer program element carried on any suitable data carrier (also not shown) such as a magnetic or optical computer disc.

It will be also be appreciated that the method for radio network relocation using an anchor may alternatively be carried out in hardware, for example in the form of an integrated circuit (not shown) such as an FPGA (Field Programmable Gate Array) or ASIC (Application Specific Integrated Circuit).

In conclusion, it will be understood that the schemes for radio network relocation utilising an anchor described above provide the following advantages: either RRM (Radio Resource Management) is facilitated and RRC signalling latency is minimised by relocation of the RRC protocol Collapsing the RNC/SGSN/GGSN into one network element (the INC) reduces the management and maintenance costs An Iu interface is only needed from an anchor INC following a relocation The SGSN—GGSN interface is not needed Multiple parenting of an RNC adds resilience and flexibility to the network or disadvantages of the DRNC approach are eliminated, except for the bandwidth consumption on the Iur interface the SGSN does not need to support SRNS Relocation, and since only two parties are involved in the relocation signalling the handover should be fast compared to 3GPP relocation (assuming that the SGSN can support relocation), reduced latency of handover can be provided, at the expense of increased traffic within the radio access network (over the Iur interface).

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

The invention claimed is:

1. An arrangement for radio network relocation of a mobile station from a first base station controller to a second base station controller, the arrangement comprising:

a first component configured to anchor one or more Serving Support Node functions with respect to the first base station controller notwithstanding relocating the mobile station to the second base station controller; and a second component configured to relocate one or more Radio Network Control functions from the first base station controller to the second base station controller when relocating the mobile station to the second base station controller;

such that Serving Support Node functions and Radio Network Control functions are split between the first and second base station controllers upon relocating the mobile station from the first base station controller to the second base station controller, wherein the first base station controller is integrated with a Serving Support Node apparatus configured to provide Serving Support Node functions in a single entity and provides user plane and signaling paths directly to a Radio Network Control component in the second base station controller.

2. The arrangement of claim 1 wherein the at least one of the first and second base station controllers is also integrated with one or more of a Radio Network Control apparatus and a Gateway Support Node apparatus.

3. The arrangement of claim 1 wherein in at least one of the first and second base station controllers a Radio Network Control component is parented by a Serving Support Node component.

4. The arrangement of claim 1 wherein the second component employs at least one of A-B:
   A Radio Access Network Application Part (RANAP) protocol
   B Radio Network Subsystem Application Part (RNSAP) protocol.

5. The arrangement of claim 1 further comprising a third base station controller, and a component configured to relocate one or more Radio Network Control functions from the second base station controller to the third base station controller during relocation of the mobile station from the second base station controller to the third base station controller.

6. The arrangement of claim 4 wherein RANAP Serving Support Node functionality is split between a Serving Support Node and a base station controller, RANAP and user plane signals are relayed by the first base station controller to the second base station controller, and the first base station controller acts as an anchor.

7. The arrangement of claim 6 further comprising a third base station controller, and a component configured to relocate one or more Radio Network Control functions from the first base station controller directly to the third base station controller during relocation of the mobile station from the second base station controller to the third base station controller.

8. The arrangement of claim 1 wherein the arrangement is arranged to be employed selectively in dependence on traffic characteristics associated with the mobile station.

9. The arrangement of claim 1 wherein the second component is arranged to relocate a Radio Network Control context from the first base station controller to the second base station controller.

10. The arrangement of claim 9 wherein the Radio Network Control context comprises at least one Radio Network Control context selected from a group consisting of:
   a) a Radio Link Control context,
   b) a Medium Access Control context,
   c) a Packet Data Convergence Protocol context, and
   d) a Radio Resource Control context.

11. The arrangement of claim 1 wherein the first component is arranged to anchor all Serving Support node functions of the mobile station and the second component is arranged to relocate all Radio Network Control functions of the mobile station.

12. The arrangement of claim 1 wherein at least one of the Radio Network Control functions relocated to the second base station is arranged to interface directly with the Serving Support Node functions without involvement of the first base station controller.

13. The arrangement of claim 1 wherein at least one of the Radio Network Control functions relocated to the second base station is arranged to interface with the Serving Support Node functions through the first base station controller.

14. The arrangement of claim 1 wherein the network comprises a UTRA system.

15. The arrangement of claim 1 wherein the network comprises a 3GPP system.

16. The arrangement of claim 1 wherein the network comprises a TDD system.

17. An integrated circuit comprising the arrangement of claim 1.

18. A base station controller comprising the arrangement of claim 1.

19. A method for radio network relocation of a mobile station from a first base station controller to a second base station controller, the method comprising:
   anchoring one or more Serving Support Node functions with respect to the first base station controller notwithstanding relocating the mobile station to the second base station controller; and
   relocating one or more Radio Network Control functions from the first base station controller to the second base station controller when relocating the mobile station to the second base station controller;
   such that Serving Support Node functions and Radio Network Control functions are split between the first and second base station controllers upon relocating the mobile station from the first base station controller to the second base station controller, and wherein the first base station controller is integrated with a Serving Support Node apparatus configured to provide Serving Support Node functions in a single entity and provides user plane and signaling paths directly to a Radio Network Control component in the second base station controller.

20. The method of claim 19 wherein the at least one of the first and second base station controllers is integrated with one or more of a Radio Network Control apparatus and a Gateway Support Node apparatus.

21. The method of claim 19 further comprising:
   parenting in at least one of the first and second base station controllers a Radio Network Control component by a Serving Support Node component.

22. The method of claim 19 wherein the step of relocating employs at least one of A-B:
   A Radio Access Network Application Part (RANAP) protocol;
   B Radio Access Network Subsystem Application Part (RANAP) protocol.

23. The method of claim 19 further comprising:
   relocating one or more Radio Network Control functions from the second base station controller to a third base station controller during relocation of the mobile station from the second base station controller to the third base station controller.

24. The method of claim 22 further comprising:
   separating RANAP Serving Support Node functionality between a Serving Support Node and a base station controller;
   relaying RANAP and user plane signals by the first base station controller to the second base station controller; and
   configuring the first base station controller to act as an anchor.

25. The method of claim 24 further comprising:
   relocating one or more Radio Network Control functions from the first base station controller directly to the third base station controller during relocation of the mobile station from the second base station controller to the third base station controller.

26. The method of claim 19 wherein the method is employed selectively in dependence on traffic characteristics associated with the mobile station.

27. The method of claim 19 further comprising:
relocating a Radio Network Control context from the first base station controller to the second base station controller.

28. The method of claim 27 wherein the Radio Network Control context comprises at least one Radio Network Control context selected from a group consisting of:
 a) a Radio Link Control context,
 b) a Medium Access Control context,
 c) a Packet Data Convergence Protocol context, and
 d) a Radio Resource Control context.

29. The method of claim 19 further comprising:
anchoring all Serving Support node functions of the mobile station with respect to the first base station controllers; and
relocating all Radio Network Control functions of the mobile station from the first base station controller to the second base station controller.

30. The method of claim 19 further comprising:
relocating at least one of the Radio Network Control functions to the second base station to interface directly with the Serving Support Node functions without involvement of the first base station controller.

31. The method of claim 19 further comprising:
relocating at least one of the Radio Network Control functions to the second base station to interface with the Serving Support Node functions through the first base station controller.

32. The method of claim 19 wherein the method is applied to a network that comprises a UTRA system.

33. The method of claim 19 wherein the method is applied to a network that comprises a 3GPP system.

34. The method of claim 19 wherein the method is applied to a network that comprises a TDD system.

* * * * *